(12) United States Patent  
Hashimoto

(10) Patent No.: US 9,574,323 B2  
(45) Date of Patent: Feb. 21, 2017

(54) HYDRAULIC EXCAVATOR

(71) Applicant: KOMATSU LTD., Tokyo (JP)

(72) Inventor: Takashi Hashimoto, Komatsu (JP)

(73) Assignee: KOMATSU LTD., Tokyo (JP)

( * ) Notice: Subject to any disclaimer, the term of this patent is extended or adjusted under 35 U.S.C. 154(b) by 287 days.

(21) Appl. No.: 14/399,318

(22) PCT Filed: Aug. 8, 2014

(86) PCT No.: PCT/JP2014/071025  
§ 371 (c)(1),  
(2) Date: Nov. 6, 2014

(87) PCT Pub. No.: WO2015/059981  
PCT Pub. Date: Apr. 30, 2015

(65) Prior Publication Data  
US 2016/0281327 A1 Sep. 29, 2016

(51) Int. Cl.
| | |
|---|---|
| *E02F 9/04* | (2006.01) |
| *E02F 9/08* | (2006.01) |
| *E02F 9/18* | (2006.01) |
| *B60K 13/04* | (2006.01) |
| *F01N 3/20* | (2006.01) |
| *F01N 13/18* | (2010.01) |

(Continued)

(52) U.S. Cl.  
CPC ............ *E02F 9/0866* (2013.01); *B60K 13/04* (2013.01); *E02F 3/32* (2013.01); *E02F 9/0883* (2013.01); *E02F 9/18* (2013.01); *E02F 9/22* (2013.01); *F01N 3/103* (2013.01); *F01N 3/2066* (2013.01); *F01N 13/1805* (2013.01); *B60Y 2200/412* (2013.01); *F01N 2590/08* (2013.01); *F01N 2610/1426* (2013.01); *F01N 2610/1453* (2013.01)

(58) Field of Classification Search  
None  
See application file for complete search history.

(56) References Cited

U.S. PATENT DOCUMENTS

| | | | |
|---|---|---|---|
| 8,096,382 B2* | 1/2012 | Kamiya | ................ E02F 9/00 180/277 |
| 8,276,370 B2* | 10/2012 | Kamiya | ............ B01D 53/9409 60/286 |

(Continued)

FOREIGN PATENT DOCUMENTS

| | | |
|---|---|---|
| CN | 1523170 A | 8/2004 |
| CN | 1532349 A | 9/2004 |

(Continued)

*Primary Examiner* — John Walters  
*Assistant Examiner* — Hilary L Johns  
(74) *Attorney, Agent, or Firm* — Drinker Biddle & Reath LLP

(57) ABSTRACT

A hydraulic excavator capable of achieving suppression of decrease in weight of a counterweight and appropriate arrangement of an exhaust gas treatment device is provided. A rear leg portion forming a leg portion supporting the exhaust gas treatment device against the revolving frame has a main body portion formed to have a U-shaped cross-section, and an open side of the U-shape of the main body portion is opposed to a counterweight. The counterweight has a pair of groove-shaped recesses formed, in which a pair of end portions of the U-shape of the main body portion is inserted.

6 Claims, 9 Drawing Sheets

(51) Int. Cl.
*E02F 3/32* (2006.01)
*E02F 9/22* (2006.01)
*F01N 3/10* (2006.01)

(56) References Cited

U.S. PATENT DOCUMENTS

| | | | |
|---|---|---|---|
| 8,459,014 B2* | 6/2013 | Kamiya | B60K 13/04 |
| | | | 60/295 |
| 8,573,646 B2* | 11/2013 | Kamiya | B60K 13/04 |
| | | | 180/89.2 |
| 9,027,697 B2* | 5/2015 | Kobayashi | E02F 9/0875 |
| | | | 180/296 |
| 9,234,328 B2* | 1/2016 | Kanamaru | E02F 3/32 |
| 9,255,382 B2* | 2/2016 | Noda | E02F 9/16 |
| 2004/0188166 A1 | 9/2004 | Sugiyama et al. | |
| 2005/0012314 A1 | 1/2005 | Kubo et al. | |
| 2012/0247861 A1 | 10/2012 | Mizuno et al. | |
| 2013/0319787 A1 | 12/2013 | Kobayashi et al. | |
| 2013/0343853 A1 | 12/2013 | Sato et al. | |
| 2014/0196975 A1 | 7/2014 | Hata et al. | |

FOREIGN PATENT DOCUMENTS

| | | |
|---|---|---|
| CN | 102639831 A | 8/2012 |
| CN | 103890276 A | 6/2014 |
| JP | 2003-147805 A | 5/2003 |
| JP | 2006-177118 A | 7/2006 |
| JP | 2012-117249 A | 6/2012 |
| JP | 2012-171596 A | 9/2012 |
| JP | 2012-177233 A | 9/2012 |
| JP | 2013-189778 A | 9/2013 |
| JP | 2014-080907 A | 5/2014 |
| KR | 20100002082 A | 1/2010 |
| WO | WO-2008/136203 A1 | 11/2008 |
| WO | WO-2011/152306 A1 | 12/2011 |

* cited by examiner

HYDRAULIC EXCAVATOR

TECHNICAL FIELD

The present invention relates to a hydraulic excavator.

BACKGROUND ART

An exhaust gas treatment device is mounted on a hydraulic excavator. As the exhaust gas treatment device, for example, a diesel particulate filter device (DPF), a diesel oxidation catalyst device (DOC), a selective catalytic reduction device (SCR), and the like are available. In particular, the selective catalytic reduction device purifies an exhaust gas by reducing a nitrogen oxide in the exhaust gas.

In a hydraulic excavator in WO2011/152306 (PTD 1), a columnar member is erected on a main frame of a revolving unit. A beam member is coupled to an upper end of the columnar member and a frame member is fixed to the beam member. In order to attach a treatment device for treating an exhaust gas from an engine to the frame member, a bracket is provided.

CITATION LIST

Patent Document

PTD 1: WO2011/152306

SUMMARY OF INVENTION

Technical Problem

A counterweight for holding balance of a vehicular body should be arranged on a revolving frame of a hydraulic excavator. Since an area of the revolving frame is limited, a leg portion supporting an exhaust gas treatment device against a revolving frame may interfere with a counterweight. When a cut is formed in a counterweight in order to avoid interference, a weight of the counterweight decreases and balance of a vehicular body of the hydraulic excavator may be lost.

An object of the present invention is to provide a hydraulic excavator capable of achieving suppression of decrease in weight of a counterweight and appropriate arrangement of an exhaust gas treatment device.

Solution to Problem

A hydraulic excavator according to the present invention includes a revolving frame, an engine, an exhaust gas treatment device, a counterweight, and a leg portion. The engine is arranged on the revolving frame. The exhaust gas treatment device treats an exhaust gas from the engine. The counterweight is arranged on the revolving frame in the rear of the engine. The leg portion supports the exhaust gas treatment device against the revolving frame. The leg portion has a main body portion formed to have a U-shaped cross-section, and an open side of the U-shape of the main body portion is opposed to the counterweight. The counterweight has a pair of groove-shaped recesses formed, in which a pair of end portions of the U-shape of the main body portion is inserted.

According to the hydraulic excavator in the present invention, by arranging the leg portion as being fitted into the counterweight, the exhaust gas treatment device can be arranged in proximity to the counterweight. Therefore, the exhaust gas treatment device can appropriately be arranged on the revolving frame of which area is limited. By providing a part of the counterweight without leaving a gap between the pair of end portions as a hollow space, decrease in weight of the counterweight can be suppressed in spite of formation of a recess in the counterweight and balance of a vehicular body of the hydraulic excavator can be maintained.

In the hydraulic excavator above, the leg portion has, at its lower end, a plate-shaped fixation portion fixed to the revolving frame. The counterweight has a second recess formed, in which the fixation portion is inserted. By forming the second recess in the counterweight, the leg portion can reliably be fixed to the revolving frame in arrangement where the leg portion is fitted in the counterweight.

In the hydraulic excavator above, the fixation portion is fixed to the revolving frame in a region lying between the pair of end portions of the U-shape of the main body portion in a plan view. Thus, a volume of the second recess for accommodating the fixation portion can be made smaller and decrease in weight of the counterweight can further reliably be suppressed.

The hydraulic excavator above is of a short tail swing type. The short tail swing hydraulic excavator is small in area of the revolving frame and weight of the counterweight is not more than adequate either. Therefore, an effect that the exhaust gas treatment device can be arranged in proximity to the counterweight and decrease in weight of the counterweight can be suppressed can more noticeably be obtained.

Advantageous Effects of Invention

As described above, according to the present invention, with decrease in weight of a counterweight being suppressed, a leg portion supporting an exhaust gas treatment device can be fixed in the vicinity of the counterweight and the exhaust gas treatment device can appropriately be arranged.

DESCRIPTION OF EMBODIMENTS

An embodiment of the present invention will be described hereinafter with reference to the drawings.

Initially, a structure of a hydraulic excavator to which the concept according to the present invention is applicable will be described.

Figure 1:
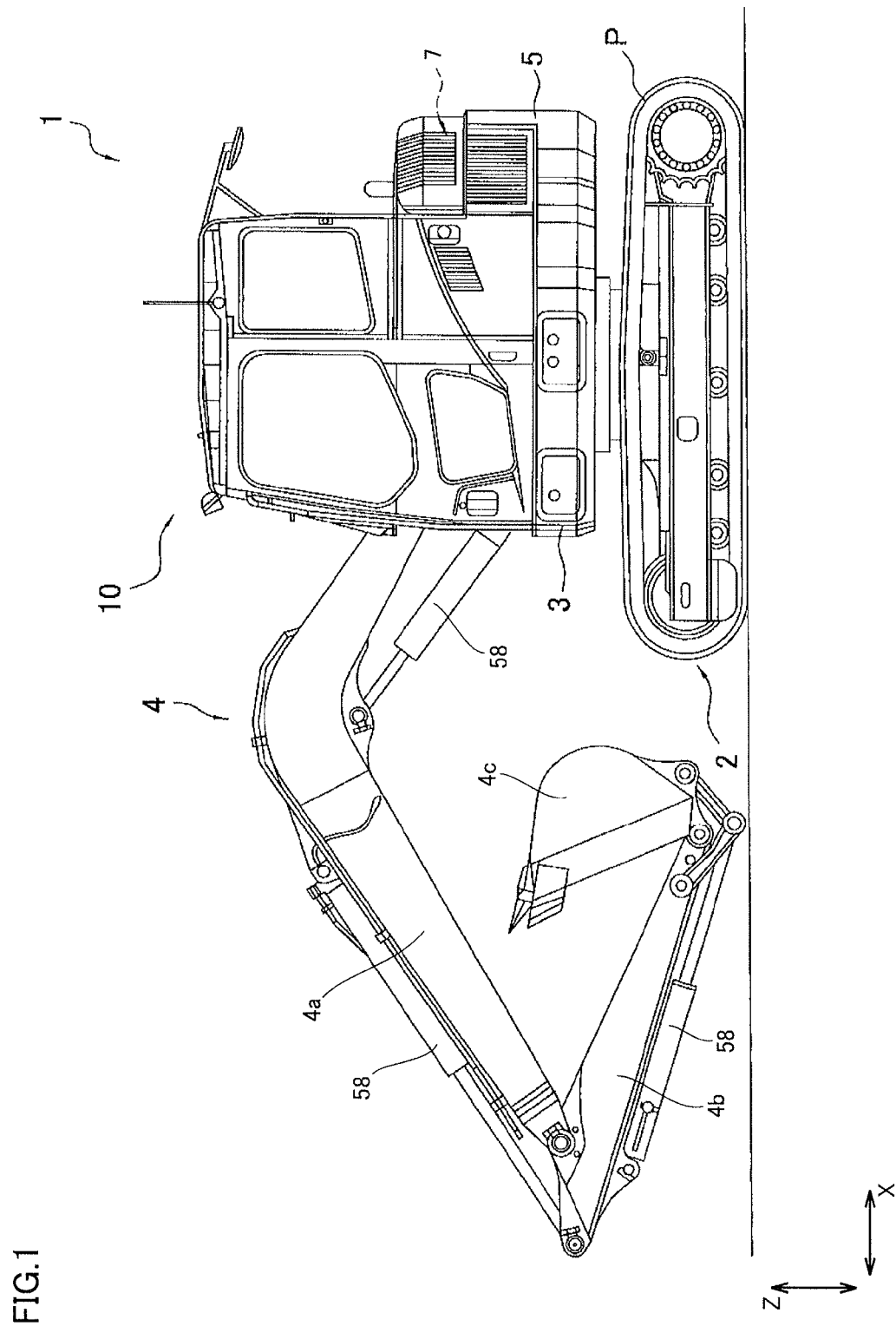
FIG. 1 is a side view showing a structure of a hydraulic excavator according to one embodiment of the present invention.

FIG. 1 is a side view showing a structure of a hydraulic excavator according to one embodiment of the present invention. Hydraulic excavator 1 according to the present embodiment mainly includes a lower carrier 2, an upper revolving unit 3, a work implement 4, a counterweight 5, an engine 7, and a cab 10, as shown in FIG. 1. Lower carrier 2 and upper revolving unit 3 mainly constitute a main body of the hydraulic excavator.

Lower carrier 2 has a pair of crawler belts P wound around left and right opposing end portions in a direction of travel. Lower carrier 2 is structured to be self-propelled as the pair of crawler belts P rotates.

Upper revolving unit 3 is set to be revolvable in any direction with respect to lower carrier 2. Upper revolving unit 3 includes, on a front left side, cab 10 which is an operator's cab which an operator of hydraulic excavator 1 gets in and out. Upper revolving unit 3 includes, on a rear side, counterweight 5 and an engine compartment for accommodating engine 7.

In the present embodiment, a forward side (a front side) of a driver while the driver is seated in cab 10 is defined as the forward side of upper revolving unit 3, a rear side of the driver is defined as the rear side of upper revolving unit 3, a left side of the driver in a seated state is defined as the left side of upper revolving unit 3, and a right side of the driver in the seated state is defined as the right side of upper revolving unit 3. In the description below, fore, aft, left, and right of upper revolving unit 3 correspond to fore, aft, left, and right of hydraulic excavator 1, respectively. In the drawings below, a fore/aft direction is shown with an arrow X in the drawings, a lateral direction is shown with an arrow Y in the drawings, and a vertical direction is shown with an arrow Z in the drawings.

Work implement 4 for such work as excavation of soil is pivotally supported by upper revolving unit 3 so as to be freely operable in a vertical direction. Work implement 4 has a boom 4a attached to be operable in the vertical direction in a substantially central portion on a front side of upper revolving unit 3, an arm 4b attached to be operable in a fore/aft direction at a tip end portion of boom 4a, and a bucket 4c attached to be operable in the fore/aft direction at a tip end portion of arm 4b. Boom 4a, arm 4b, and bucket 4c are each driven by a hydraulic cylinder 58.

Work implement 4 is provided on the right of cab 10, which is one side of cab 10, such that an operator who gets on board cab 10 can view a tip end portion of work implement 4. Cab 10 is arranged lateral to a portion of attachment of work implement 4.

Counterweight 5 is a weight arranged in the rear portion of upper revolving unit 3 for keeping balance of a vehicular body during excavation or the like. Hydraulic excavator 1 is formed as a short tail swing hydraulic excavator, which is small in radius of swing of a rear surface of counterweight 5. Therefore, the rear surface of counterweight 5 is formed in an arc shape around a center of swing of upper revolving unit 3 when viewed from above. Engine 7 is accommodated in the engine compartment in the rear portion of upper revolving unit 3.

Figure 2:
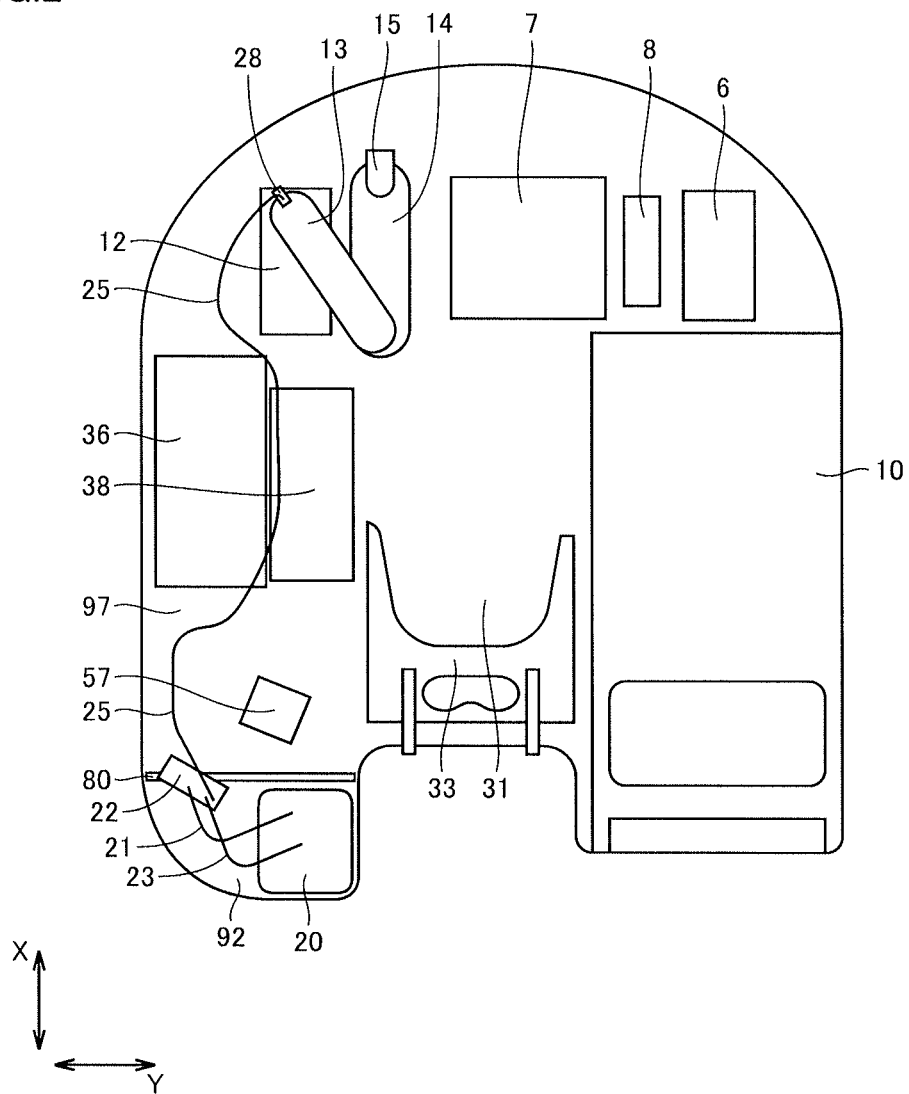
FIG. 2 is a schematic plan view showing arrangement of each device on a revolving frame.

FIG. 2 is a schematic plan view showing arrangement of each device on a revolving frame 31. A lower side in FIG. 2 shows a forward side of upper revolving unit 3 and an upper side in FIG. 2 shows a rear side of upper revolving unit 3. FIG. 2 illustrates a path of a pipe (a supply pipe 21 and a delivery pipe 25) for supplying a reducing agent from a reducing agent tank 20 to an exhaust gas treatment unit over revolving frame 31 in hydraulic excavator 1 shown in FIG. 1.

A reducing agent and a precursor of the reducing agent are herein collectively referred to as a "reducing agent".

Engine 7 which is a motive power source for driving lower carrier 2 and work implement 4 shown in FIG. 1 is mounted on revolving frame 31. Engine 7 is mounted in a rear portion of a center frame on a central side in the lateral direction of revolving frame 31. Engine 7 large in weight is arranged at a rear end of the main body of the hydraulic excavator, which is distant from a center bracket 33 supporting work implement 4 and is close to counterweight 5, in consideration of weight balance with work implement 4 attached in the front of the main body of the hydraulic excavator. The engine compartment accommodating engine 7 is provided in the rear portion of upper revolving unit 3.

The engine compartment accommodates a cooling unit 6 and a fan 8. In the engine compartment, cooling unit 6, fan 8, and engine 7 are disposed in this order from left to right. Fan 8 is rotationally driven by engine 7 so as to generate a flow of air which passes through the engine compartment. Fan 8 generates a flow of air from the left to the right of the main body of the hydraulic excavator. Cooling unit 6 is arranged on the left of fan 8, which is upstream in the flow of air generated by fan 8. Engine 7 is arranged on the right of fan 8, which is downstream in the flow of air generated by fan 8.

Cooling unit 6 includes a radiator, an intercooler, and an oil cooler. The radiator is a cooling device for cooling a coolant for engine 7. The intercooler is a cooling device for cooling compression air supplied to engine 7. The oil cooler is a cooling device for cooling a hydraulic oil supplied to various hydraulic actuators mounted on hydraulic excavator 1, such as hydraulic cylinder 58 (FIG. 1).

Hydraulic excavator 1 includes in the engine compartment, an exhaust gas treatment unit for treating and purifying an exhaust gas emitted from engine 7. The exhaust gas treatment unit mainly includes exhaust gas treatment devices 12 and 14, an intermediate connection pipe 13, an exhaust stack 15, and an injection nozzle 28 for a reducing agent. In the plan view shown in FIG. 2, the exhaust gas treatment unit is arranged on the right of engine 7. A not-shown hydraulic pump driven by engine 7 so as to transfer a hydraulic oil is directly coupled to engine 7. The hydraulic pump is arranged adjacently on the right of engine 7 and the exhaust gas treatment unit is arranged above the hydraulic pump.

Exhaust gas treatment device 12 is connected to engine 7 through an exhaust pipe 11 (FIG. 3) which will be described later. Exhaust gas treatment device 14 is connected to exhaust gas treatment device 12 through intermediate connection pipe 13. The exhaust gas emitted from engine 7 is emitted from exhaust stack 15 into atmosphere after it successively passed through exhaust gas treatment devices 12 and 14. In the flow of emission of the exhaust gas from engine 7, exhaust gas treatment device 12 is arranged downstream of engine 7 and exhaust gas treatment device 14 is arranged downstream of exhaust gas treatment device 12.

Exhaust gas treatment device 12 oxidizes an unburned gas such as carbon monoxide and hydrocarbon contained in the exhaust gas emitted from engine 7 so as to lower a concentration of the unburned gas in the exhaust gas. Exhaust gas treatment device 12 is implemented, for example, by a diesel oxidation catalyst device. Exhaust gas treatment device 14 reduces a nitrogen oxide contained in the exhaust gas through reaction with a reducing agent and chemically changes the nitrogen oxide to a harmless nitrogen gas, to thereby lower a concentration of the nitrogen oxide in the exhaust gas. Exhaust gas treatment device 14 is implemented, for example, by an $NO_x$ removal device of a selective catalytic reduction type. Intermediate connection pipe 13 is provided with injection nozzle 28 for injecting a reducing agent into intermediate connection pipe 13. Intermediate connection pipe 13 has a function as a mixing pipe for injecting and mixing the reducing agent into the exhaust gas.

Hydraulic excavator 1 includes a reducing agent supply portion for supplying a reducing agent to the exhaust gas treatment unit. The reducing agent supply portion includes reducing agent tank 20 and a reducing agent pump 22. Reducing agent tank 20 stores a reducing agent used in exhaust gas treatment device 14. For example, a urea solution is suitably employed as the reducing agent, however, the reducing agent is not limited thereto.

Reducing agent tank 20 and reducing agent pump 22 are mounted on a side frame on the right in revolving frame 31. Reducing agent pump 22 is arranged forward relative to the engine compartment. Reducing agent tank 20 is arranged forward relative to reducing agent pump 22. Reducing agent tank 20 is arranged at a distance from engine 7 which is a device at a high temperature, for prevention of deterioration of the reducing agent due to temperature increase thereof, and it is arranged, for example, at a front end of revolving frame 31.

Reducing agent tank 20 and reducing agent pump 22 are coupled to each other through supply pipe 21 and a return pipe 23. Supply pipe 21 is a pipe for sending the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to each other through delivery pipe 25. Delivery pipe 25 is a pipe for transferring the reducing agent from reducing agent pump 22 to injection nozzle 28.

The reducing agent transferred from reducing agent tank 20 through supply pipe 21 to reducing agent pump 22 is branched into two in reducing agent pump 22. The reducing agent not used for exhaust gas treatment is returned from reducing agent pump 22 through return pipe 23 to reducing agent tank 20. The reducing agent used for exhaust gas treatment reaches injection nozzle 28 from reducing agent pump 22 through delivery pipe 25 and is sprayed from injection nozzle 28 into intermediate connection pipe 13.

The exhaust gas from engine 7 flows into exhaust gas treatment device 14 through intermediate connection pipe 13. Intermediate connection pipe 13 is provided upstream of exhaust gas treatment device 14 in the flow of the exhaust gas. The reducing agent suctioned from reducing agent tank 20 is injected into the exhaust gas which flows through intermediate connection pipe 13, through injection nozzle 28 attached to intermediate connection pipe 13. The reducing agent is injected into the upstream side of exhaust gas treatment device 14 in the flow of the exhaust gas. An amount of the reducing agent injected into the exhaust gas is controlled based on a temperature of the exhaust gas which passes through exhaust gas treatment device 14 and a concentration of a nitrogen oxide in the exhaust gas.

Reducing agent tank 20 is arranged at the front end on revolving frame 31 and exhaust gas treatment device 14 is arranged at the rear end on revolving frame 31. With this arrangement, supply pipe 21 and delivery pipe 25 for transferring the reducing agent extend in the fore/aft direction of the main body of the hydraulic excavator and extend from the front end toward the rear end of revolving frame 31.

On the right side frame of revolving frame 31, a fuel tank 36, a hydraulic oil tank 38, and a main valve 57 are mounted. Fuel tank 36 stores a fuel to be supplied to engine 7. Hydraulic oil tank 38 stores a hydraulic oil to be supplied to such a hydraulic actuator as hydraulic cylinder 58 (FIG. 1).

Since fuel tank 36 and hydraulic oil tank 38 are large in weight, they are arranged at positions in front of the exhaust gas treatment unit, in consideration of weight balance on revolving frame 31. Taking into account operability in an operation for replenishing fuel tank 36 with a fuel, fuel tank 36 is arranged closer to a side end of revolving frame 31 than hydraulic oil tank 38. Fuel tank 36 and hydraulic oil tank 38 are each formed as a pressure-resistant tank in a parallelepiped shape. A front surface of each of fuel tank 36 and hydraulic oil tank 38 is formed as a rear wall of a valve room 97 accommodating main valve 57.

Main valve 57 is formed as an assembly of a large number of control valves and pilot valves. Main valve 57 supplies and discharges a hydraulic oil suctioned from hydraulic oil tank 38 and transferred by a not-shown hydraulic pump to such a hydraulic actuator as hydraulic cylinder 58 shown in FIG. 1, as well as a motor for travel and a motor for swing which are not shown. Thus, main valve 57 actuates the vehicular body of hydraulic excavator 1 and work implement 4 in response to an operation by an operator.

Since main valve 57 is smaller in weight than fuel tank 36 and hydraulic oil tank 38, it is arranged in front of fuel tank 36 and hydraulic oil tank 38, in consideration of weight balance on revolving frame 31. Main valve 57 is arranged in the rear of reducing agent tank 20.

Valve room 97 accommodating main valve 57 and a tank room 92 accommodating reducing agent tank 20 are partitioned by a partition 80. Partition 80 is arranged in the rear of reducing agent tank 20 and in front of main valve 57, and arranged between reducing agent tank 20 and main valve 57. Partition 80 is interposed between reducing agent tank 20 and main valve 57 in the fore/aft direction of upper revolving unit 3. Partition 80 is formed as a front wall of valve room 97. Partition 80 is formed as a rear wall of tank room 92.

Figure 3:
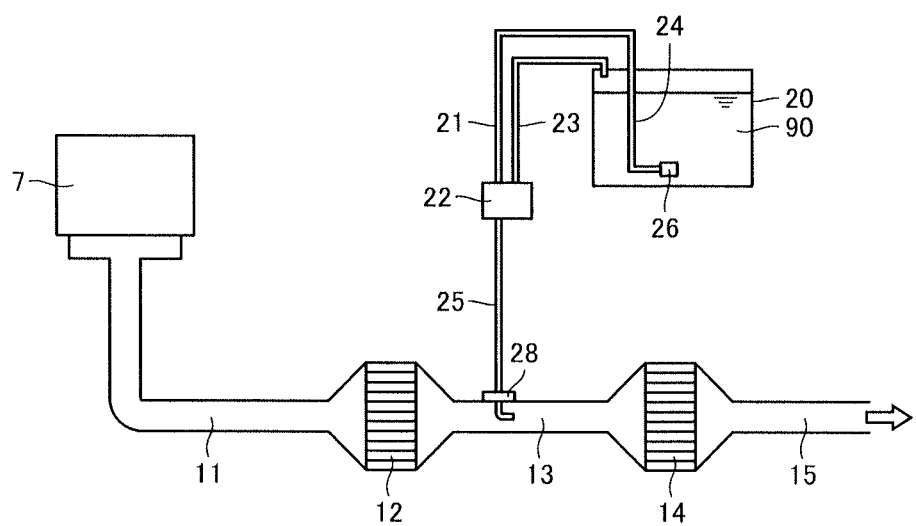
FIG. 3 is a functional diagram schematically showing a path for a reducing agent and an exhaust path for an exhaust gas from an engine.

FIG. 3 is a functional diagram schematically showing a path for the reducing agent and an exhaust path for the exhaust gas from engine 7 in hydraulic excavator 1 in the present embodiment. As shown in FIG. 3, the exhaust gas emitted from engine 7 is exhausted from exhaust stack 15 to the outside of a vehicle after it successively passed through exhaust pipe 11, exhaust gas treatment device 12, intermediate connection pipe 13, and exhaust gas treatment device 14. Injection nozzle 28 is provided in intermediate connection pipe 13 upstream of exhaust gas treatment device 14 in the flow of the exhaust gas.

A reducing agent 90 is stored in reducing agent tank 20. A suction pipe 24 in which reducing agent 90 which flows out of reducing agent tank 20 flows is arranged in reducing agent tank 20. A strainer (a filter) 26 is connected to a tip end of suction pipe 24. Suction pipe 24 is coupled to supply pipe 21. Reducing agent 90 suctioned from reducing agent tank 20 is transferred by reducing agent pump 22 and reaches injection nozzle 28 after it successively passed through supply pipe 21 and delivery pipe 25. Reducing agent 90 not used for exhaust gas treatment is returned to reducing agent tank 20 from reducing agent pump 22 through return pipe 23.

Injection nozzle 28 has a function as a reducing agent injector for injecting reducing agent 90 suctioned from reducing agent tank 20 to the upstream side of the exhaust gas relative to exhaust gas treatment device 14. Injection nozzle 28 supplies reducing agent 90 into the exhaust gas which flows through intermediate connection pipe 13. A concentration of a nitrogen oxide in the exhaust gas lowers as a result of reaction of the nitrogen oxide contained in the exhaust gas with reducing agent 90 in exhaust gas treatment device 14. In a case that a urea solution is employed as reducing agent 90, the urea solution is decomposed in intermediate connection pipe 13 and converted to ammonia, so that the nitrogen oxide is decomposed to harmless nitrogen and oxygen as a result of reaction between the nitrogen oxide and ammonia. An exhaust gas of which amount of nitrogen oxide has lowered to an appropriate value is emitted through exhaust stack 15.

Figure 4:
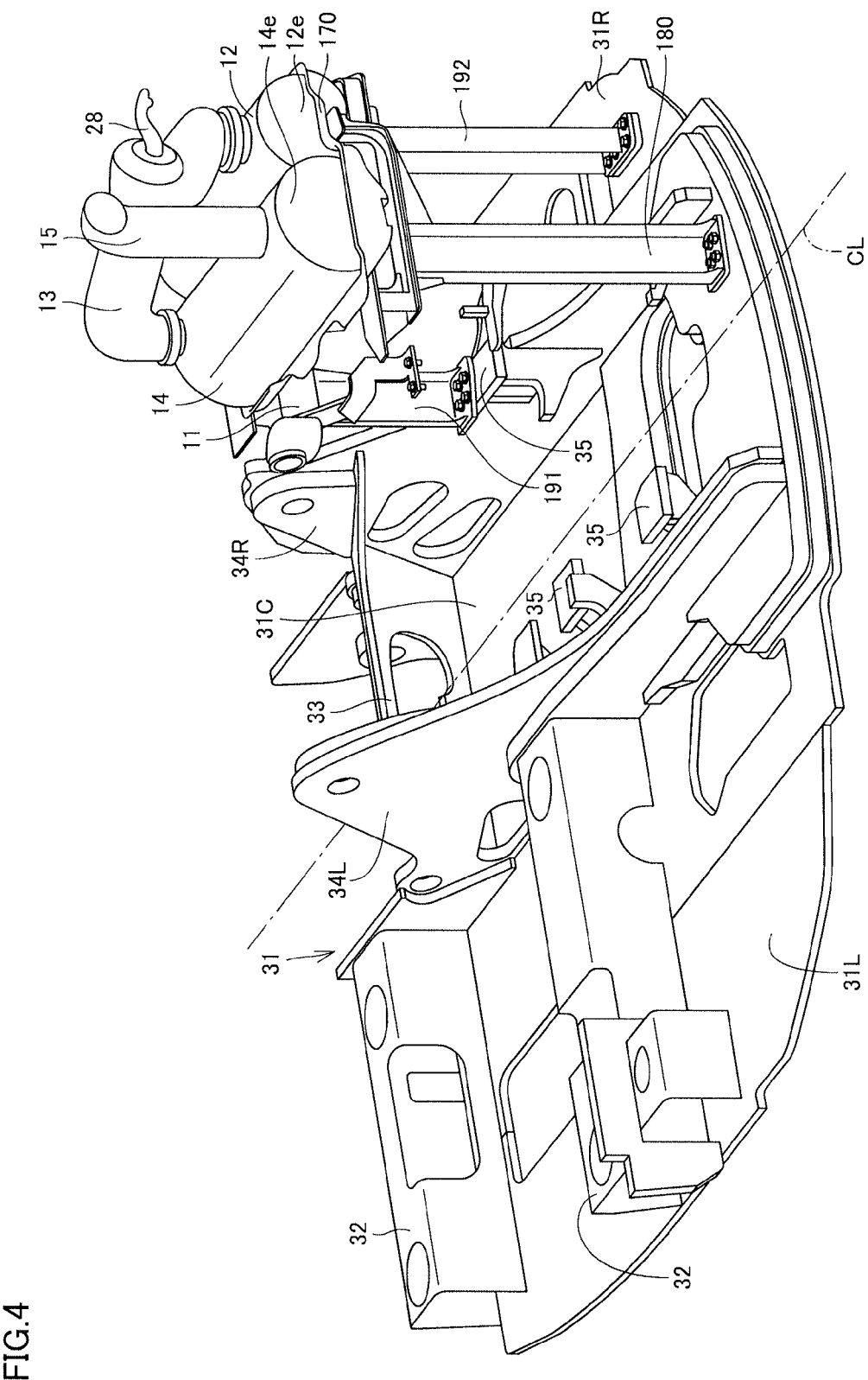
FIG. 4 is a perspective view showing a state that an exhaust gas treatment device is mounted on the revolving frame.

FIG. 4 is a perspective view showing a state that exhaust gas treatment devices 12 and 14 are mounted on revolving frame 31. Revolving frame 31 has a center frame 31C, a right side frame 31R, a left side frame 31L, and vertical plates 34R and 34L. A chain dotted line in FIG. 4 shows a centerline CL in the lateral direction of revolving frame 31.

Center frame 31C is located in the center in the lateral direction of revolving frame 31. Right side frame 31R is arranged on the right of center frame 31C and formed integrally with center frame 31C. Left side frame 31L is arranged on the left of center frame 31C and formed integrally with center frame 31C.

Vertical plates 34R and 34L extend along the fore/aft direction and are arranged at an interval in the lateral direction. Vertical plates 34R and 34L are each formed from a vertically erected plate. Vertical plates 34R and 34L are provided orthogonal to center frame 31C, right side frame 31R, and left side frame 31L.

Center bracket 33 supporting a proximal end portion of work implement 4 is provided at a front end portion of vertical plates 34R and 34L. Center bracket 33 forms a portion of attachment of work implement 4. Work implement 4 is placed between a pair of vertical plates 34R and 34L and fixed to be operable in the vertical direction. The pair of left and right vertical plates 34R and 34L is inclined such that a height dimension thereof is smaller as they are away from center bracket 33.

A plurality of mount portions 35 are attached to vertical plates 34R and 34L. Engine 7 shown in FIG. 2 is supported against revolving frame 31 as being mounted on mount portions 35. By providing mount portions 35 in vertical plates 34R and 34L high in strength, engine 7 large in weight can be supported on revolving frame 31.

A pair of floor frames 32 and 32 is arranged on the upper surface of left side frame 31L at an interval in the fore/aft direction. Cab 10 (FIGS. 1 and 2) is carried on floor frames 32 and 32. Cab 10 is mounted on revolving frame 31 with floor frames 32 being interposed.

Exhaust gas treatment devices 12 and 14 are supported by a pan-shaped bracket 170. Bracket 170 is supported by a leg portion against revolving frame 31. The leg portion is constituted of a rear leg portion 180, a front leg portion 191, and a right leg portion 192. The leg portion supports exhaust gas treatment devices 12 and 14 at three locations against revolving frame 31, with bracket 170 being interposed. Thus, exhaust gas treatment devices 12 and 14 large in weight are supported securely over revolving frame 31.

Rear leg portion 180 is arranged in the rear of front leg portion 191 and right leg portion 192. Rear leg portion 180 is fixed to center frame 31C. Front leg portion 191 is arranged in front of rear leg portion 180 and right leg portion 192. Front leg portion 191 is fixed onto mount portion 35 provided in vertical plate 34R. Right leg portion 192 is arranged on the right of rear leg portion 180 and front leg portion 191. Right leg portion 192 is fixed to right side frame 31R.

Exhaust gas treatment devices 12 and 14 are arranged to extend across center frame 31C and right side frame 31R and arranged on the right in the lateral direction of revolving frame 31. A not-shown hydraulic pump is arranged adjacently on the right of engine 7 which is mounted on mount portion 35 and is not illustrated in FIG. 4, and exhaust gas treatment devices 12 and 14 are arranged above the hydraulic pump. Exhaust gas treatment devices 12 and 14 are arranged at a distance from revolving frame 31 and the hydraulic pump is arranged below bracket 170 supporting exhaust gas treatment devices 12 and 14.

Exhaust gas treatment devices 12 and 14 are arranged such that a longitudinal direction of each of them extends along the fore/aft direction of revolving frame 31. Exhaust gas treatment devices 12 and 14 are disposed in the order of exhaust gas treatment device 14 and exhaust gas treatment device 12 from the center toward the end in the lateral direction of revolving frame 31. A rear end 12e of exhaust gas treatment device 12 is arranged further forward relative to a rear end 14e of exhaust gas treatment device 14. Exhaust gas treatment device 12 is smaller in dimension in the longitudinal direction than exhaust gas treatment device 14.

Figure 5:
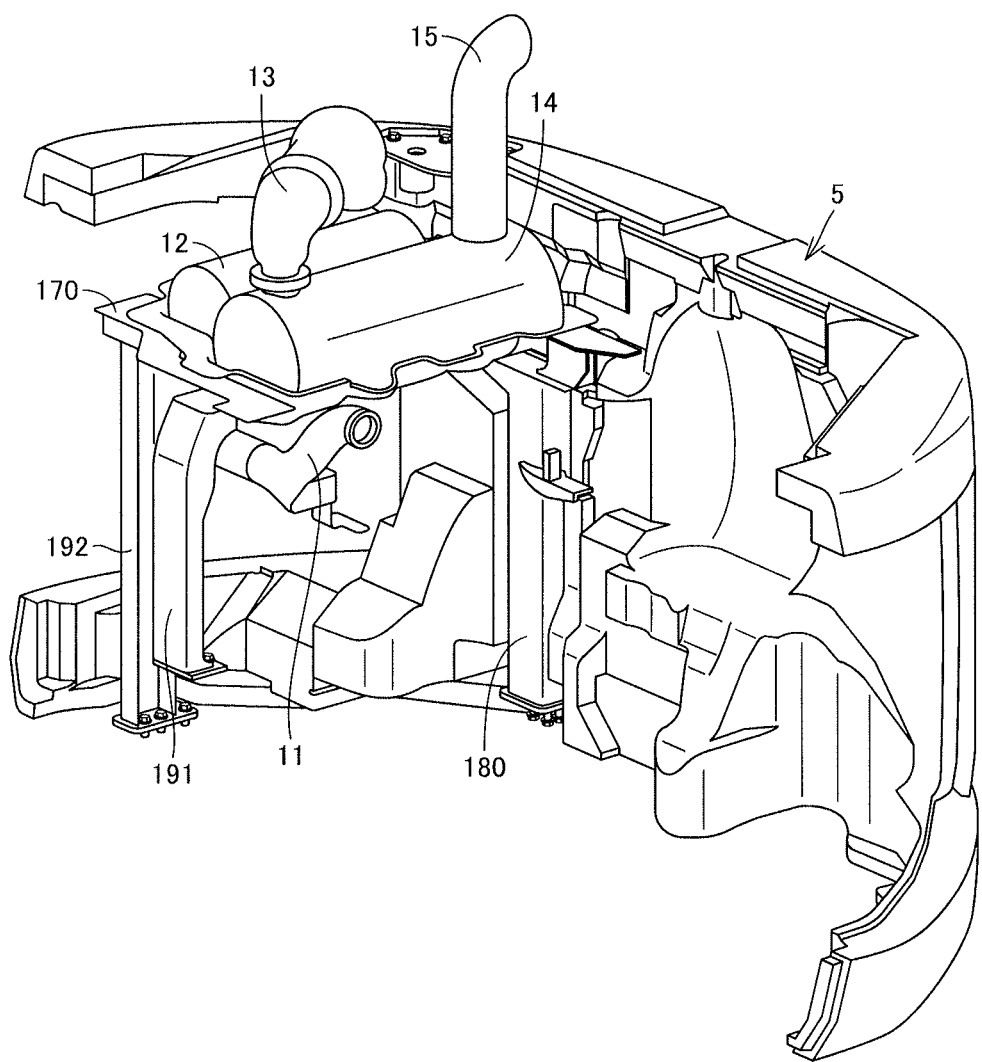
FIG. 5 is a perspective view showing arrangement of an exhaust gas treatment device relative to a counterweight.
Figure 6:
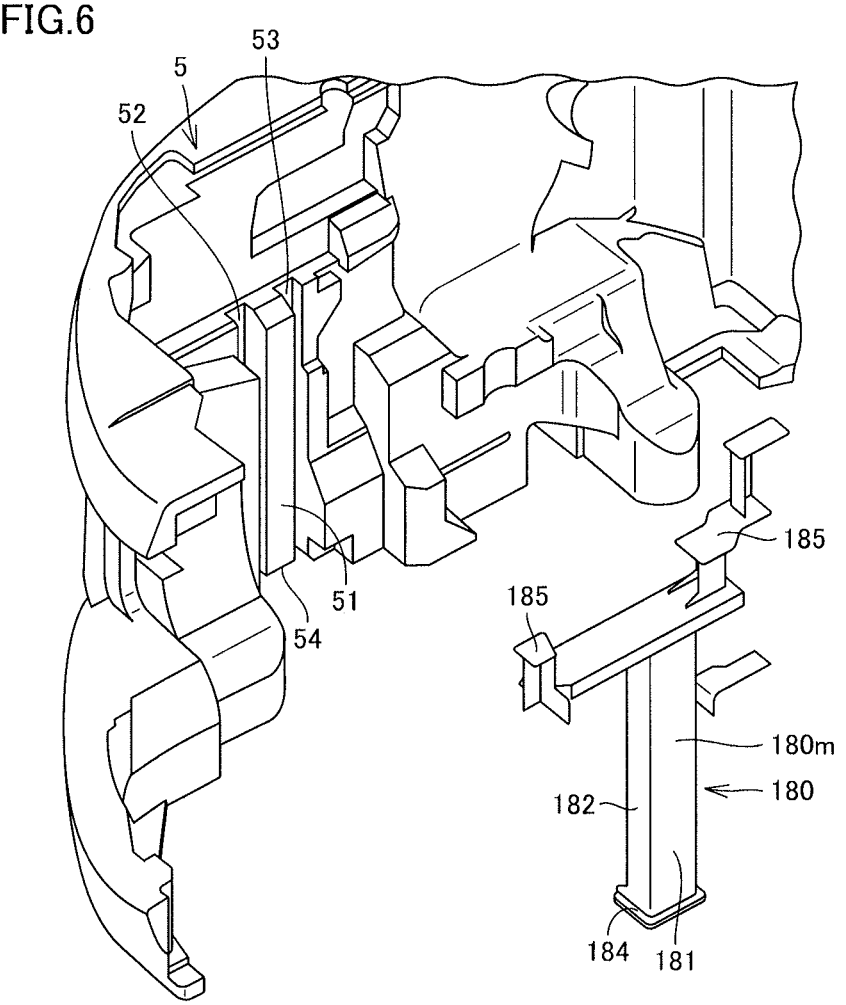
FIG. 6 is an exploded perspective view showing a structure of the counterweight and a rear leg portion.
Figure 7:
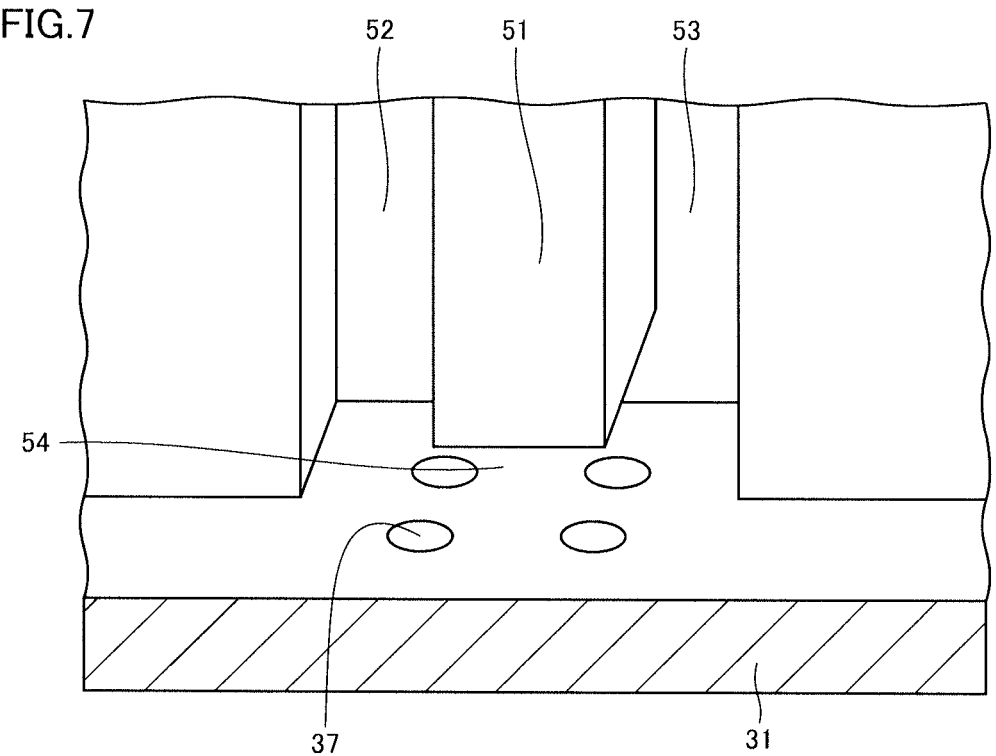
FIG. 7 is a partial perspective view showing a structure of a main portion of the counterweight.

FIG. 5 is a perspective view showing arrangement of exhaust gas treatment devices 12 and 14 relative to counterweight 5. FIG. 6 is an exploded perspective view showing a structure of counterweight 5 and rear leg portion 180. FIG. 7 is a partial perspective view showing a structure of a main portion of counterweight 5. FIG. 5 illustrates counterweight 5 viewed from forward left. FIG. 6 illustrates counterweight 5 viewed from forward right. FIG. 7 illustrates a part of a portion of contact of counterweight 5 with revolving frame 31.

Counterweight 5 is arranged on revolving frame 31 in the rear of engine 7. Counterweight 5 has an inner peripheral surface forming a rear wall of the engine compartment. The inner peripheral surface of counterweight 5 is opposed to each device mounted on revolving frame 31, such as engine 7, fan 8, and exhaust gas treatment devices 12 and 14 shown in FIG. 2. As shown in FIGS. 5 and 6, on the inner peripheral surface of counterweight 5, a complicated projecting and recessed shape is formed such that a volume of counterweight 5 can be maximized in consideration of arrangement of each device adjacent to counterweight 5.

In the inner peripheral surface of counterweight 5, as shown in FIGS. 6 and 7, a pair of recesses 52 and 53 which are the inner peripheral surface recessed like a groove is formed. A projection 51 protruding forward relative to recesses 52 and 53 is formed between the pair of recesses 52 and 53. Projection 51 and recesses 52 and 53 extend along the vertical direction.

As shown in FIG. 7, projection 51 does not extend as far as revolving frame 31. Projection 51 is not in contact with revolving frame 31 and a space is formed between a lower surface of projection 51 and the upper surface of revolving frame 31. This space is formed as a recess 54 recessed relative to the inner peripheral surface of counterweight 5. Recesses 52 and 53 communicate with recess 54.

Similarly to projection 51, recesses 52 and 53 do not extend as far as revolving frame 31. An area extending along the upper surface of revolving frame 31 in the recessed shape recessed relative to the inner peripheral surface of counterweight 5 forms recess 54 and an area extending along projection 51 forms recesses 52 and 53.

As shown in FIG. 7, a plurality of (four in the embodiment shown in FIG. 7) through holes 37 are formed in revolving frame 31. Through hole 37 passes through revolving frame 31 in a direction of thickness. Some or all of through holes 37 are formed at positions in revolving frame 31 facing recess 54.

As shown in FIG. 6, rear leg portion 180 has a main body portion 180m. Main body portion 180m extends vertically. Main body portion 180m functions as a pillar on which compression load is applied in a direction of extension thereof. Main body portion 180m is formed to have a U-shaped cross-section. Main body portion 180m has a base portion 181, an end portion 182, and an end portion 183 which is not illustrated in FIG. 6.

Base portion 181 and end portions 182 and 183 each have a shape like a flat plate. End portion 182 is coupled to one of sides of base portion 181 extending in the vertical direction and end portion 183 is coupled to the other of them. Directions of extension of base portion 181 and end portion 182 intersect with each other, and typically are orthogonal to each other. Directions of extension of base portion 181 and end portion 183 intersect with each other, and typically are orthogonal to each other. End portion 182 and end portion 183 extend in parallel to each other.

A beam member is coupled to an upper end of main body portion 180m of rear leg portion 180. A support portion 185 is provided at each of opposing ends of the beam member. Support portion 185 carries bracket 170 thereon so as to support bracket 170.

A plate-shaped fixation portion 184 is provided at a lower end of rear leg portion 180. Fixation portion 184 is coupled to the lower end of main body portion 180m As fixation portion 184 is fixed to revolving frame 31, the entire rear leg portion 180 is fixed to and erected on revolving frame 31.

The exploded perspective view shown in FIG. 6 illustrates relative positions of rear leg portion 180 and counterweight 5 in a state that rear leg portion 180 is fixed onto revolving frame 31 while counterweight 5 is not mounted on revolving frame 31. As the pair of end portions 182 and 183 of main body portion 180m of rear leg portion 180 is inserted in the pair of groove-shaped recesses 52 and 53 formed in counterweight 5, counterweight 5 and rear leg portion 180 are arranged as being combined. Thus, as shown in FIG. 5, exhaust gas treatment devices 12 and 14 can be arranged in proximity to counterweight 5.

In the arrangement shown in FIG. 5 where end portions 182 and 183 of rear leg portion 180 are arranged in recesses 52 and 53 and rear leg portion 180 and counterweight 5 are combined with each other as well, rear leg portion 180 is not fixed to counterweight 5. Exhaust gas treatment devices 12 and 14 supported by the leg portion including rear leg portion 180 against revolving frame 31 and counterweight 5 are mounted on revolving frame 31 independently of and separately from each other.

Figure 8:
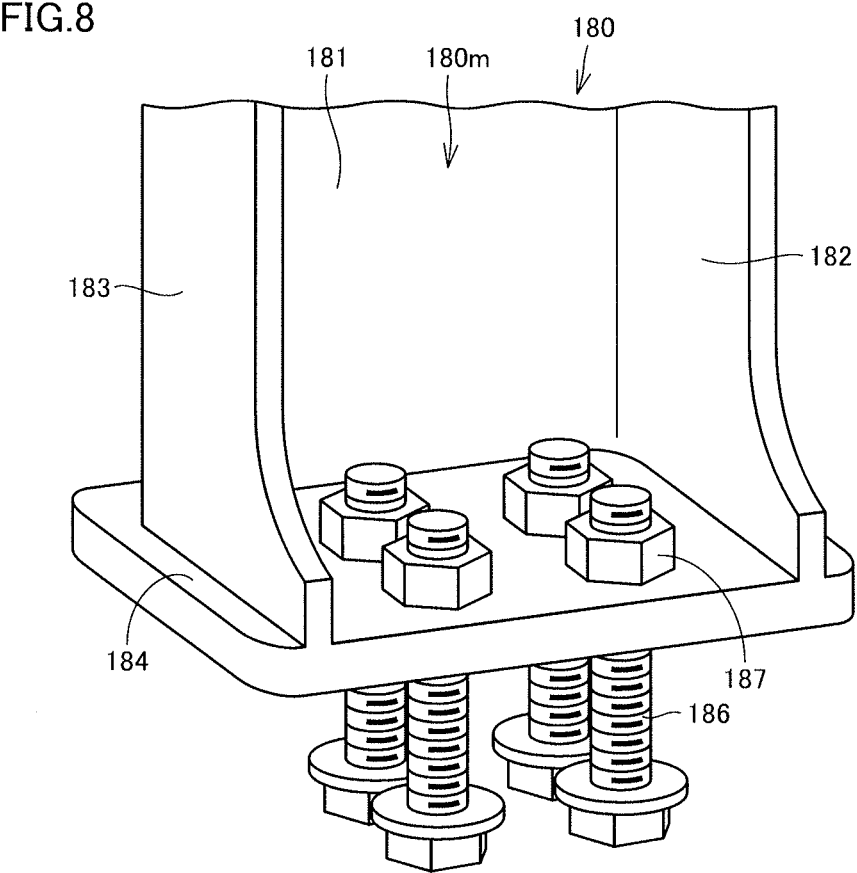
FIG. 8 is a perspective view showing a structure of a fixation portion at a lower end of the rear leg portion.

FIG. 8 is a perspective view showing a structure of fixation portion 184 at the lower end of rear leg portion 180. As described above, main body portion 180m of rear leg portion 180 has base portion 181 and end portions 182 and 183, and is formed to have a U-shaped cross-section. Fixation portion 184 has a shape like a plate and is arranged at the lower end of main body portion 180m.

A plurality of (four in the embodiment shown in FIG. 8) through holes are formed in fixation portion 184. The through hole passes through fixation portion 184 in the direction of thickness. A bolt 186 is arranged through this through hole. A fixation nut 187 surrounding the through hole is attached to an upper surface of fixation portion 184, and bolt 186 is screwed to fixation nut 187 and attached to fixation portion 184.

Bolt 186 is inserted in through hole 37 (FIG. 7) formed in revolving frame 31 from a lower surface side of revolving frame 31, passes through through hole 37 and the through hole formed in fixation portion 184, and screwed to fixation nut 187. Fixation portion 184 is thus fixed to revolving frame 31.

Figure 9:
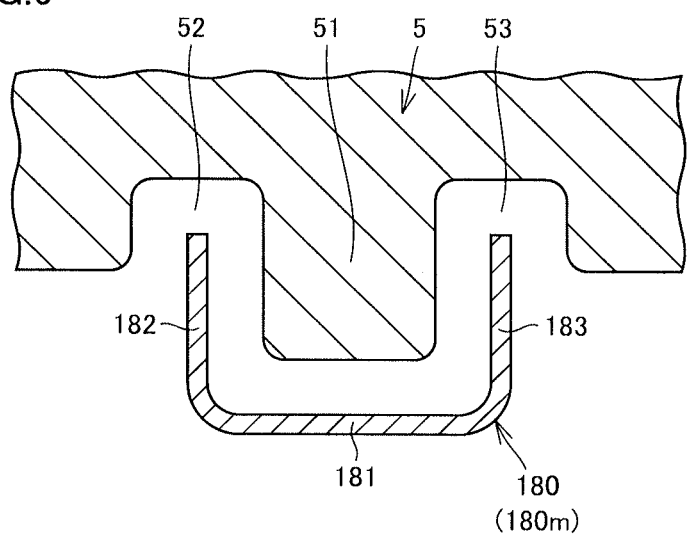
FIG. 9 is a first cross-sectional view showing arrangement of the rear leg portion relative to the counterweight.

FIG. 9 is a first cross-sectional view showing arrangement of rear leg portion 180 relative to counterweight 5. FIG. 9 illustrates a cross-section of rear leg portion 180 and counterweight 5 along a plane in parallel to a direction of extension of revolving frame 31 in a state shown in FIG. 5 that rear leg portion 180 and counterweight 5 are combined. FIG. 9 shows a cross-sectional view at a position where projection 51 and recesses 52 and 53 are formed in counterweight 5.

As shown in FIG. 9, main body portion 180m of rear leg portion 180 has base portion 181 and a pair of end portions 182 and 183. End portion 182 is joined to one edge of plate-shaped base portion 181 and end portion 183 is joined to the other edge thereof, so that main body portion 180m is formed to have a U-shaped cross-section. The open side of the U-shape of main body portion 180m is opposed to counterweight 5. End portions 182 and 183 are arranged closer to counterweight 5 than base portion 181.

Counterweight 5 has a pair of groove-shaped recesses 52 and 53 formed. One end portion 182 of rear leg portion 180 is inserted in one recess 52. The other end portion 183 of rear leg portion 180 is inserted in the other recess 53. Base portion 181 is not inserted in recesses 52 and 53 and is not fitted into counterweight 5. Base portion 181 is arranged on the forward side of revolving frame 31 relative to the inner peripheral surface of counterweight 5.

Projection 51 protruding from a bottom surface of recesses 52 and 53 is formed between a pair of recesses 52 and 53. Projection 51 is arranged between the pair of end portions 182 and 183 of main body portion 180m of rear leg portion 180. Projection 51 is arranged in the inside of the U-shape of main body portion 180m. Projection 51 is surrounded on three sides by base portion 181 and end portions 182 and 183 of main body portion 180m having a U-shaped cross-section.

The pair of end portions 182 and 183 is inserted in respective, different recesses 52 and 53. Projection 51 forming a part of counterweight 5 is arranged in a region lying between end portions 182 and 183. In counterweight 5, a recess accommodating both of end portions 182 and 183 is not formed but recess 52 accommodating end portion 182 and recess 53 accommodating end portion 183 are separately formed, and projection 51 protruding toward base portion 181 of rear leg portion 180 is formed between recesses 52 and 53. Counterweight 5 has an increased volume because it has projection 51.

Figure 10:
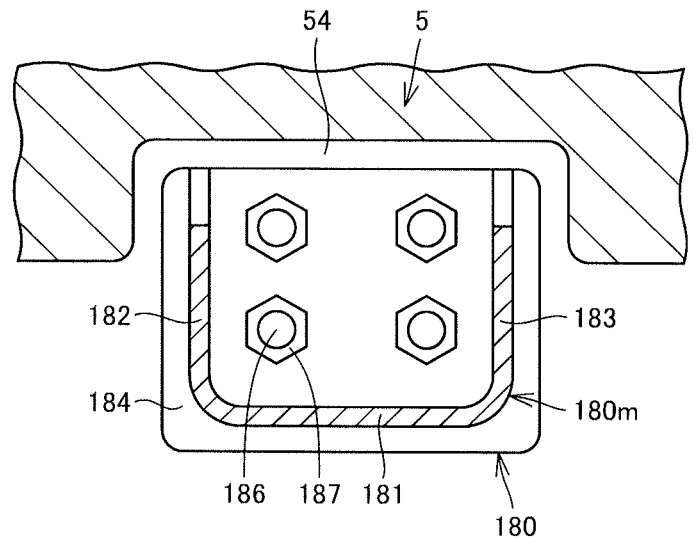
FIG. 10 is a second cross-sectional view showing arrangement of the rear leg portion relative to the counterweight.

FIG. 10 is a second cross-sectional view showing arrangement of rear leg portion 180 relative to counterweight 5. Likewise FIG. 9, FIG. 10 illustrates a cross-section of rear leg portion 180 and counterweight 5 along a plane in parallel to the direction of extension of revolving frame 31 in a state shown in FIG. 5 that rear leg portion 180 and counterweight 5 are combined. FIG. 10 shows a cross-sectional view at a position where recess 54 is formed in counterweight 5.

As shown in FIG. 10, rear leg portion 180 has, at its lower end, plate-shaped fixation portion 184. A through hole passing through fixation portion 184 in the direction of thickness is formed in fixation portion 184. Bolt 186 is arranged through revolving frame 31 and fixation portion 184 and screwed to fixation nut 187, so that fixation portion 184 is fixed to revolving frame 31. Thus, rear leg portion 180 is fixed to revolving frame 31.

Recess 54 is formed in counterweight 5. Fixation portion 184 of rear leg portion 180 is inserted in recess 54. Fixation portion 184 is fixed to revolving frame 31 in a region lying between the pair of end portions 182 and 183 of main body portion 180m in a plan view. Since recess 54 in which fixation portion 184 is inserted is formed in counterweight 5, the entire rear leg portion 180 can be arranged further in proximity to counterweight 5 as being combined with counterweight 5.

Figure 11:
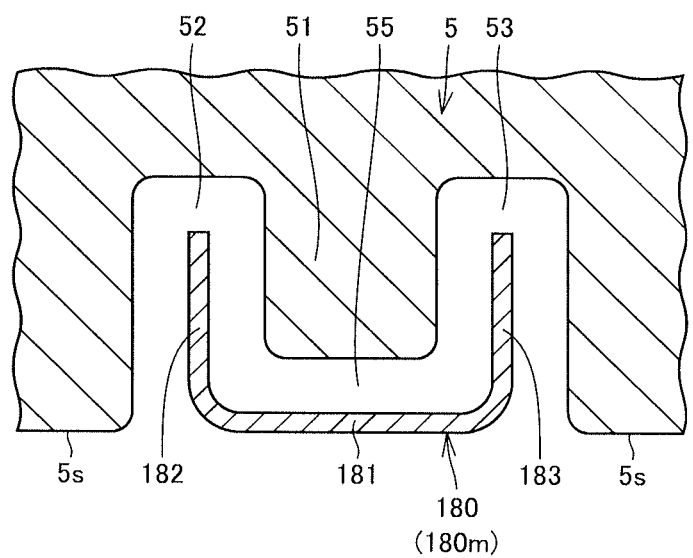
FIG. 11 is a cross-sectional view showing a modification of arrangement of the rear leg portion relative to the counterweight.

FIG. 11 is a cross-sectional view showing a modification of arrangement of rear leg portion 180 relative to counterweight 5. FIG. 11 illustrates counterweight 5 in the modification and illustrates a cross-section of rear leg portion 180 and counterweight 5 at a position in the vertical direction the same as in FIG. 9.

In counterweight 5 in the modification shown in FIG. 11, as in counterweight 5 shown in FIG. 9, recess 52 in which end portion 182 is inserted, recess 53 in which end portion 183 is inserted, and projection 51 between recesses 52 and 53 are formed. In counterweight 5 in the modification, a recess 55 recessed relative to an inner peripheral surface 5s of counterweight 5 is further formed.

Base portion 181 of rear leg portion 180 is accommodated in recess 55. The entire main body portion 180m of rear leg portion 180 is fitted into counterweight 5 in the modification. Thus, in counterweight 5 in the modification, the surface of base portion 181 and inner peripheral surface 5s of counterweight 5 can be arranged substantially flush with each other.

A function and effect of the present embodiment will now be described.

Hydraulic excavator 1 in the present embodiment has rear leg portion 180 as shown in FIG. 5. Rear leg portion 180 forms a leg portion supporting exhaust gas treatment devices 12 and 14 against revolving frame 31. As shown in FIG. 9, rear leg portion 180 has main body portion 180m formed to have a U-shaped cross-section and the open side of the U-shape of main body portion 180m is opposed to counterweight 5. Counterweight 5 has a pair of groove-shaped recesses 52 and 53 formed, in which the pair of end portions 182 and 183 of the U-shape of main body portion 180m is inserted.

Since recesses 52 and 53 where end portions 182 and 183 are inserted are formed in counterweight 5, interference between counterweight 5 and rear leg portion 180 is prevented. At least a part of rear leg portion 180 is arranged as being fitted into counterweight 5. Since rear leg portion 180 forms the leg portion supporting exhaust gas treatment devices 12 and 14, exhaust gas treatment devices 12 and 14 can be arranged further in proximity to counterweight 5. Therefore, exhaust gas treatment devices 12 and 14 can appropriately be arranged on revolving frame 31 of which area is limited.

End portions 182 and 183 of rear leg portion 180 are not inserted in the same recess but end portion 182 is inserted in groove-shaped recess 52 and end portion 183 is inserted in groove-shaped recess 53 different from recess 52. Projection 51 is formed between recesses 52 and 53. Since projection 51 is arranged between the pair of end portions 182 and 183, projection 51 does not affect arrangement of rear leg portion 180 relative to counterweight 5. By providing projection 51 which is a part of counterweight 5 instead of leaving a gap between the pair of end portions 182 and 183 as a hollow space, a volume of counterweight 5 can be increased. Thus, even when recesses 52 and 53 are formed in counterweight 5, decrease in weight of counterweight 5 can be suppressed and balance of the vehicular body of hydraulic excavator 1 can be maintained.

As shown in FIG. 8, rear leg portion 180 has, at its lower end, plate-shaped fixation portion 184 fixed to revolving frame 31. As shown in FIG. 10, counterweight 5 has recess 54 formed, in which fixation portion 184 is inserted. By forming recess 54 in which fixation portion 184 is inserted in counterweight 5 in addition to recesses 52 and 53 in which end portions 182 and 183 of main body portion 180m of rear leg portion 180 are inserted, rear leg portion 180 can reliably be fixed to revolving frame 31 in arrangement where at least a part of rear leg portion 180 is fitted into counterweight 5.

As shown in FIGS. 8 and 10, fixation portion 184 is fixed to revolving frame 31 in a region lying between the pair of end portions 182 and 183 of the U-shape of main body portion 180m in a plan view. By doing so, a space for fixing rear leg portion 180 to revolving frame 31 does not have to be provided outside the U-shape of main body portion 180m. Therefore, a volume of recess 54 for accommodating fixation portion 184 can be made smaller and weight of counterweight 5 can more reliably be held.

As shown in FIG. 1, hydraulic excavator 1 is of a short tail swing type. In short tail swing hydraulic excavator 1, an area of revolving frame 31 is small and weight of counterweight 5 is not more than adequate either. Therefore, as described in the present embodiment, end portions 182 and 183 of rear leg portion 180 are inserted in the pair of recesses 52 and 53 formed in counterweight 5, respectively, and projection 51 is formed between recesses 52 and 53. According to such a structure, an effect that exhaust gas treatment devices 12 and 14 can be arranged in proximity to counterweight 5 and decrease in weight of counterweight 5 can be suppressed can more noticeably be obtained.

In the description of the embodiment so far, the structure that two exhaust gas treatment devices 12 and 14 are supported by the leg portion against revolving frame 31 with bracket 170 being interposed has been described. The structure of rear leg portion 180 and counterweight 5 in the present embodiment may be applied to a leg portion which alone supports either exhaust gas treatment device 12 or exhaust gas treatment device 14. An exhaust gas treatment device supported by the leg portion against revolving frame 31 may be any exhaust gas treatment device other than DOC or SCR, or may be an exhaust gas treatment unit obtained by combining a plurality of any exhaust gas treatment devices.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 hydraulic excavator; 4 work implement; 5 counterweight; 5s inner peripheral surface; 7 engine; 12, 14 exhaust gas treatment device; 12e, 14e rear end; 13 intermediate connection pipe; 20 reducing agent tank; 22 reducing agent pump; 28 injection nozzle; 31 revolving frame; 31C center frame; 31L left side frame; 31R right side frame; 33 center bracket; 34L, 34R vertical plate; 36 fuel tank; 37 through hole; 38 hydraulic oil tank; 51 projection; 52, 53, 54, 55 recess; 170 bracket; 180 rear leg portion; 180*m* main body portion; 181 base portion; 182, 183 end portion; 184 fixation portion; 185 support portion; 186 bolt; 187 fixation nut; 191 front leg portion; and 192 right leg portion.

The invention claimed is:

1. A hydraulic excavator, comprising:
    a revolving frame;
    an engine arranged on said revolving frame;
    an exhaust gas treatment device for treating an exhaust gas from said engine;
    a counterweight arranged on said revolving frame in a rear of said engine; and
    a leg portion supporting said exhaust gas treatment device against said revolving frame,
    said leg portion having a main body portion formed to have a U-shaped cross-section and an open side of the U-shape of said main body portion being opposed to said counterweight, and
    said counterweight having a pair of groove-shaped recesses formed, in which a pair of end portions of the U-shape of said main body portion is inserted.

2. The hydraulic excavator according to claim 1, wherein
    said leg portion has, at a lower end, a plate-shaped fixation portion fixed to said revolving frame, and
    said counterweight has a second recess formed, in which said fixation portion is inserted.

3. The hydraulic excavator according to claim 2, wherein
    said fixation portion is fixed to said revolving frame in a region lying between said pair of end portions of the U-shape of said main body portion in a plan view.

4. The hydraulic excavator according to claim 1, wherein said hydraulic excavator is of a short tail swing type.

5. The hydraulic excavator according to claim 2, wherein said hydraulic excavator is of a short tail swing type.

6. The hydraulic excavator according to claim 3, wherein said hydraulic excavator is of a short tail swing type.

* * * * *